(12) United States Patent
Courtois et al.

(10) Patent No.: US 7,204,456 B2
(45) Date of Patent: Apr. 17, 2007

(54) LANDING GEAR HAVING A GAS VESSEL, AND METHODS OF MAINTAINING SUCH LANDING GEAR

(75) Inventors: Maud Courtois, Paris (FR); Sébastien Gautrain, Jouy-en-Josas (FR); Marc Gillet, Issy-les-Moulineaux (FR); Laurent Martinez, Mountrouge (FR)

(73) Assignee: Messier-Dowty SA, Velizy Villacoublay (FR)

( * ) Notice: Subject to any disclaimer, the term of this patent is extended or adjusted under 35 U.S.C. 154(b) by 0 days.

(21) Appl. No.: 11/078,103

(22) Filed: Mar. 11, 2005

(65) Prior Publication Data

US 2005/0211831 A1    Sep. 29, 2005

(30) Foreign Application Priority Data

Mar. 12, 2004    (FR) .................................. 04 02570

(51) Int. Cl.
    *B64C 25/60*    (2006.01)
(52) U.S. Cl. ................................. 244/104 FP
(58) Field of Classification Search ............ 244/104 R, 244/104 FP; 188/269, 314, 315, 322.13; 267/64.11–64.28
    See application file for complete search history.

(56) References Cited

U.S. PATENT DOCUMENTS

| | | | |
|---|---|---|---|
| 1,950,995 A * | 3/1934 | Piecard ................... | 267/64.15 |
| 2,367,977 A * | 1/1945 | Thornhill ................. | 267/64.15 |
| 2,389,849 A * | 11/1945 | Gruss ...................... | 267/64.25 |
| 2,721,074 A * | 10/1955 | De Carbon .............. | 267/64.15 |
| 3,533,613 A * | 10/1970 | Bendicsen ............... | 267/64.28 |
| 3,540,683 A * | 11/1970 | Foster ..................... | 244/104 R |
| 3,724,832 A * | 4/1973 | Ceska ..................... | 267/64.22 |
| 3,888,436 A * | 6/1975 | Sealey .................... | 244/104 FP |
| 3,889,904 A | 6/1975 | Jones et al. | |
| 4,088,286 A * | 5/1978 | Masclet et al. ......... | 244/102 SL |
| 4,426,109 A * | 1/1984 | Fike, Jr. .................... | 293/133 |

FOREIGN PATENT DOCUMENTS

| | | |
|---|---|---|
| EP | 0546902 | 6/1993 |
| FR | 2686857 | 8/1993 |
| GB | 430337 | 6/1935 |
| GB | 637360 | 5/1950 |

* cited by examiner

*Primary Examiner*—Galen Barefoot
(74) *Attorney, Agent, or Firm*—McCormick, Paulding & Huber LLP

(57) ABSTRACT

A landing gear includes a shock absorber having first and second elements slidable relative to each other, the slidable elements defining an inside volume which is filled in part with hydraulic fluid so as to leave a first chamber filled with gas under pressure and located at the end of one of the slidable elements. A vessel filled with gas under pressure is housed in the end and is provided with a shutter member that is initially in a closed state and that is suitable for taking up a stable open state when the pressure in the first chamber exceeds the pressure in the vessel by a predetermined threshold amount.

10 Claims, 1 Drawing Sheet

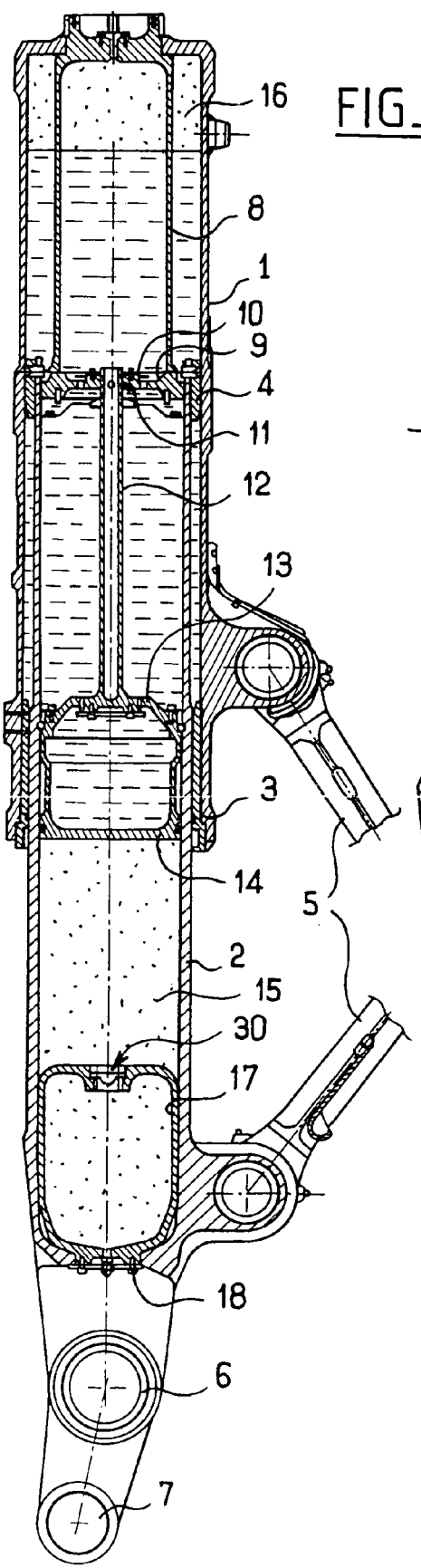
FIG_1
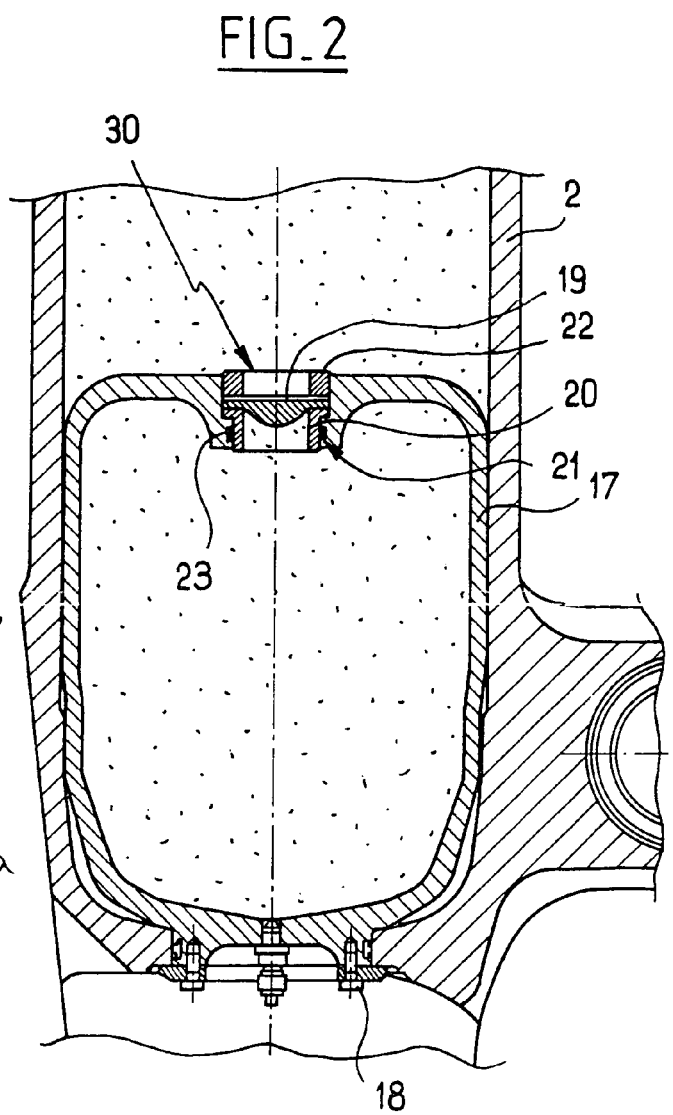
FIG_2

LANDING GEAR HAVING A GAS VESSEL, AND METHODS OF MAINTAINING SUCH LANDING GEAR

CROSS-REFERENCE TO RELATED APPLICATIONS

This application is entitled to the benefit of French Patent Application No. 0402570 filed on Mar. 12, 2004, herein incorporated in its entirety.

The invention relates to landing gear having a gas vessel, and to a method of maintaining such landing gear.

FIELD OF THE INVENTION

Background of the Invention

Landing gear is known that includes a shock absorber having a first element and a second element that are mounted to be slidable relative to each other, said slidable elements defining an internal volume which is filled in part with hydraulic fluid so as to leave a chamber filled with gas under pressure at the end of one of the slidable elements.

In general, one of the elements of the shock absorber includes a diaphragm that presents throttling orifices through which the hydraulic fluid is forced when the shock absorber is shortened. This throttling dissipates a fraction of the kinetic energy of the airplane that has led to the shock absorber being shortened.

Another fraction of the kinetic energy is absorbed by compressing the gas contained in the chamber, by reducing the volume of said chamber as the shock absorber shortens.

For landing gear situated under the fuselage of the airplane, it is important to ensure that the landing gear cannot break free from its attachment points, since that would run the risk of injuring passengers or of damaging fuel tanks.

For this purpose, it is known to limit the force applied to a shock absorber by providing structural portions that are designed to buckle when the force applied to the shock absorber exceeds a predetermined threshold. However, such systems are difficult to design and they require any buckled structural portions to be replaced before the airplane can take off again, and that can disturb the scheduling of the line provided by the airplane and can be problematic when the airplane is to be found at an airport that is remote and isolated.

OBJECT OF THE INVENTION

An object of the invention is to provide landing gear provided with a safety mechanism enabling the force applied to the shock absorber to be limited, but not requiring immediate maintenance action after the safety mechanism has been triggered.

BRIEF SUMMARY OF THE INVENTION

The invention provides landing gear including a shock absorber having fist and second elements slidable relative to each other, said slidable elements defining an inside volume which is filled in part with hydraulic fluid so as to leave a first chamber filled with gas under pressure and located at the end of one of the slidable elements. According to the invention, a vessel filled with gas under pressure is housed in said end and is provided with a shutter member that is initially in a closed state and that is suitable for taking up a stable open state when the pressure in the first chamber exceeds the pressure in the vessel by a predetermined threshold amount.

Thus, when the shutter member opens, the first chamber has its volume increased by the volume of the vessel, thereby reducing the slope of the curve plotting force generated in the shock absorber while it is being shortened. Reducing the slope of the force curve provides a corresponding reduction in the maximum force generated by the shock absorber, thereby limiting said force. The integrity of the landing gear is thus saved.

The airplane can then continue to be used after the shutter member has opened (possibly with a limit on the conditions in which the airplane can be used), since no structural portion of the landing gear has been damaged. The maintenance operation for restoring the vessel to its initial state can thus be deferred and can be undertaken when the airplane has returned to its base.

The stability of the open position makes it easy to detect that the safety mechanism of the invention has been triggered by measuring the pressure in the first chamber which, for a given amount of shock absorber shortening, differs depending on whether or not the shutter member is closed or open, or in a variant by measuring the extent to which the shock absorber has shortened, which for given pressure in the first chamber differs depending on whether the shutter member is closed or open.

In a preferred embodiment of the invention, the shutter member comprises a pellet subjected to the opposing action of the pressure in the first chamber and the pressure in the vessel, the pellet being designed to break when the pressure in the first chamber exceeds the pressure in the vessel by said threshold amount.

Advantageously, the pellet bears circumferentially against a flanged ring fitted in a stepped bore formed through the wall of the vessel. In a variant embodiment, the pellet has an outside diameter that is welded to the flanged ring. Preferably, the pellet is held in position by an annular nut.

The invention also provides a method of maintaining landing gear of the invention, which method includes the step, after the shutter member has opened, of reinitializing the shutter member while the vessel is in place in the end of the associated slidable elements.

In a particular implementation, the reinitialization step consists in replacing the shutter member by a shutter member in the initial closed state.

In this method applied to landing gear in which the vessel is fitted with a pellet shutter member, the reinitialization step consists in replacing at least the broken pellet by a non-broken pellet.

The invention also provides a method of maintaining landing gear of the invention, which method includes the step, after the shutter member has opened, of replacing the vessel by a vessel that has previously been filled with gas under pressure and that has a shutter member that is in the initial closed state.

BRIEF DESCRIPTION OF THE DRAWING

The invention will be better understood in the light of the following description made with reference to the figures of the accompanying drawing, in which:

FIG. 1 is a longitudinal section view of landing gear in accordance with the invention; and FIG. 2 is an enlarged view of FIG. 1 showing the gas bottle.

DETAILED DESCRIPTION OF THE INVENTION

The invention is applied herein to landing gear of the direct type with an integrated shock absorber mounted beneath the fuselage of an airplane. Clearly the invention is not restricted to this type of landing gear, and is also applicable to landing gear having an external shock absorber, and not necessarily mounted under the fuselage.

With reference to FIG. 1, and in conventional manner, the landing gear comprises a strut 1 connected to the airplane, having a rod 2 mounted to slide therein in sealed manner. To this end, the strut 1 carries at its bottom end a bottom bearing 3 having an inside surface in contact with the rod 2, and the rod 2 carries at its top portion a top bearing 4 having an outside surface in contact with the strut 1.

A scissors linkage 5 (of which only the ends of the branches can be seen) is mounted between the strut 1 and the rod 2 to prevent the rod 2 from turning relative to the strut 1.

At its bottom end, the rod 2 forms a fork whose branches include bores 6 for receiving the pivot shaft of a rocker beam carrying wheels (not shown). The branches of the fork extend beyond the bores 6 and present bores 7 for receiving the ends of brake bars (not shown) for angularly holding the braking rings fitted to the wheels carried by the rocker beam.

A perforated tube 8 secured to the top of the strut 1 extends inside it and carries at its bottom end a diaphragm 9 having an outside surface that slides in sealed manner against the inside surface of the rod 2.

The diaphragm 9 includes throttling orifices 10, and a central orifice 11 through which there extends a throttling needle 12 secured to the rod 2 by means of a support 13 fitted inside the rod 2 by means of a retaining ring and including through orifices.

A separator piston 14 is mounted to slide in sealed manner inside the rod 2 under the support 13 which constitutes a top abutment for the separator piston 14.

When the landing gear is relaxed, as shown, hydraulic fluid (represented by horizontal dashes) fills the entire volume extending between the separator piston 14 and the diaphragm 9, and also the annular volume extending between the outside wall of the rod 2 and the inside wall of the strut 1 between the bearings 3, 4. The volume extending above the diaphragm 9 is filled in part by hydraulic fluid.

The remainder of the volume inside the landing gear defines a first chamber 15 which extends under the separator piston 14, and a second chamber 16 formed by the fraction of the volume above the diaphragm 9 that is not filled with hydraulic fluid.

The first chamber 15 is filled with nitrogen (represented by dots) at a pressure of about 120 bars, while the second chamber 16 is filled with nitrogen at a pressure of about 20 bars.

According to the invention, a vessel 17 is placed in the end of the rod 2, being fixed to the bottom of the rod 2 by bolts 18. The vessel 17 is closed by a shutter member 30 and is filled with nitrogen at a pressure of 90 bars.

As can be seen more clearly in FIG. 2, the shutter member 30 comprises a pellet 19, in this case made of nickel alloy, which bears circumferentially against a flanged ring 20 engaged in a stepped bore 21 formed in the wall of the vessel 17, a bead of welding extending in this case over the outside diameter of the pellet 19 in order to connect it to the flanged ring 20. The pellet 19 is held in position by means of an annular nut 22. Tightening the annular nut 22 prevents any nitrogen from leaking between the pellet 19 and the flanged ring 20. A sealing ring 23 received in an annular groove extends over the flanged ring 20 to prevent any nitrogen leaking between the flanged ring 20 and the wall of the vessel 17.

The shock absorber operates as follows. During landing, the rod 2 is forced into the strut 1. This causes the hydraulic fluid to be forced to pass through the throttling orifices in the diaphragm 9. This throttling dissipates energy by internal friction within the hydraulic fluid. The quantity of hydraulic fluid that passes through the diaphragm 9 decreases the volume of the second chamber 16 correspondingly, thereby causing the nitrogen contained therein to be compressed, i.e. causing its pressure to increase.

It should be observed that the fluid lying above the diaphragm 9 has its pressure determined by the pressure that exists in the second chamber 16. The fluid that lies below the diaphragm 9 has its pressure determined by the resistance to hydraulic fluid flowing through the throttling orifices in the diaphragm 9. When this pressure reaches the pressure to which the first chamber 15 is inflated, the separator piston 14 begins to move, thereby compressing the gas in the first chamber 15.

The nitrogen contained in the chambers 15, 16 behaves like a spring delivering force in compliance with a substantially polytropic relationship.

Thereafter, the rod 2 finds a position of stable equilibrium in the strut 1 under the effect of that fraction of the weight of the airplane that is applied thereto. In the equilibrium position, the hydraulic fluid and the nitrogen contained in the two chambers 15 and 16 are at the same pressure.

Under certain circumstances, for example if the airplane is poorly loaded, or if there is a failure of a wing undercarriage during a landing, the central landing gear may need to support a large fraction of the weight of the airplane, exceeding the limit for which it was designed.

In order to ensure that the force exerted on the landing gear does not exceed a dangerous level, the pellet 19 is designed to break when the pressure difference between the pressure in the chamber 15 and the pressure in the vessel 17 reaches a threshold of 180 bars. In practice, in this case, the pellet 19 is designed to break by forming petals, while still remaining as a single part.

Once the pellet 19 has broken, the volume of the first chamber 15 is immediately increased by the volume of the vessel 17, thereby reducing the slope of the curve for force generated by the shock absorber, and thus reducing the maximum force that can be applied to the landing gear.

The vessel 17 provided with the threshold shutter member 30 thus constitutes simple safety means, serving to limit the maximum forces applied to the landing gear.

If the pellet 19 is broken, then the pressure that exists in the first chamber 15 is lower than the pressure that would exist in said chamber had the pellet 19 not been broken. It is thus easy to detect whether or not the pellet 19 has broken by measuring the pressure in the first chamber 15.

Although such a pressure reduction might possibly restrict the conditions under which the airplane can be used (in particular concerning maximum weight or stowing range), it nevertheless does not prevent the airplane being used commercially so it can continue to provide service until it returns to a base that is equipped to perform a maintenance operation in order to reinitialize the shock absorber.

In the invention, the maintenance operation consists in separating the rod 2 from the strut 1, and in replacing the assembly comprising the ring 20 and the broken pellet 19 with a similar assembly having a pellet that has not been broken, the vessel 17 remaining in position in the bottom of the rod 2. It then suffices to replace the rod 2 in the strut 1, and to refill the landing gear with hydraulic fluid, and inflate the first chamber 15, the second chamber 16, and the vessel 17 (via an inflation valve that is accessible from the outside and that is not shown).

In a variant, the maintenance operation comprises the step of replacing the vessel 17 with a vessel that has already been filled with gas under pressure and that has a shutter member in the initial closed state.

The invention is not limited to the particular features described above, but on the contrary covers any variant coming within the ambit of the invention as defined by the claims.

In particular, although the threshold shutter member is shown as comprising a breakable element, the shutter member could be of any other type, providing it presents a closed initial state and a stable open state into which it passes when a threshold is exceeded, for example it could be a bistable pressure-release valve. Reinitializing the shutter member would then consist in causing it to perform the opposite transition from the open state to the closed state, either by acting on the shutter member to cause it to switch back to the initial closed state, or by replacing certain portions in order to put it back in the initial closed state.

What is claimed is:

1. Landing gear including a shock absorber having first and second elements slidable relative to each other, said slidable elements defining an inside volume which is filled in part with hydraulic fluid so as to leave a first chamber filled with gas under pressure and located at the end of one of the slidable elements, wherein a vessel filled with gas under pressure is housed in said end and is provided with a shutter member that is initially in a closed state and that is suitable for taking up a stable open state when the pressure in the first chamber exceeds the pressure in the vessel by a predetermined threshold amount.

2. Landing gear according to claim 1, wherein the shutter member comprises a pellet subjected to the opposing action of the pressure in the first chamber and the pressure in the vessel, the pellet being designed to break when the pressure in the first chamber exceeds the pressure in the vessel by said threshold amount.

3. Landing gear according to claim 2, wherein the pellet bears circumferentially against a flanged ring fitted in a stepped bore formed through the wall of the vessel.

4. Landing gear according to claim 3, wherein the pellet has an outside diameter that is welded to the flanged ring.

5. Landing gear according to claim 3, wherein the pellet is held in position by an annular nut.

6. A method of maintaining landing gear according to claim 1, including, after the shutter member has opened:

reinitializing the shutter member while the vessel is in place in the end of the associated slidable elements.

and then re-inflating the vessel.

7. A maintenance method according to claim 6, wherein the reinitialization step consists in replacing the shutter member by a shutter member in the initial closed state.

8. A maintenance method according to claim 6, applied to landing gear according to claim 2, wherein the reinitialization step consists in replacing at least the broken pellet by a non-broken pellet.

9. A method of maintaining landing gear according to claim 1, including the step, after the shutter member has opened, of replacing the vessel by a vessel that has previously been filled with gas under pressure and having a shutter member that is in, the initial closed state.

10. A landing gear, comprising:

a shock absorber having first and second elements slidable relative to each other, said slidable elements defining an inside volume which is filled in part with hydraulic fluid so as to leave a first chamber filled with gas under a first predetermined pressure and located at the end of one of the slidable elements;

a vessel filled with gas under a second predetermined pressure is housed in said end, said first pressure being different from said second predetermined pressure;

wherein said vessel is provided with a shutter member that is initially in a closed state and that is suitable for taking up an open state when said first predetermined pressure in the first chamber exceeds said second predetermined pressure in said vessel by a predetermined threshold amount; and wherein said first predetermined pressure of said first chamber is lessened when said shutter member is in said open state.

* * * * *